(12) United States Patent
Pavlin et al.

(10) Patent No.: US 6,220,586 B1
(45) Date of Patent: Apr. 24, 2001

(54) MULTIPLE TORSION SPRING AND METHODS OF USE

(75) Inventors: Robert J. Pavlin, Grand Haven; Todd K. Watkins, Ravenna; Gary T. Wehnes, Muskegon; Curt A. Converse, N. Muskegon; James E. Adams, Muskegon, all of MI (US)

(73) Assignee: Precision Products Group, Muskegon, MI (US)

( * ) Notice: Subject to any disclaimer, the term of this patent is extended or adjusted under 35 U.S.C. 154(b) by 0 days.

(21) Appl. No.: 09/399,966

(22) Filed: Sep. 21, 1999

(51) Int. Cl.[7] ................................................... F16F 1/06
(52) U.S. Cl. ............................ 267/155; 267/168; 267/180
(58) Field of Search ..................................... 267/154, 155, 267/156, 157, 168–180, 286, 289, 290

(56) References Cited

U.S. PATENT DOCUMENTS

| 1,087,186 | * | 2/1914 | Scholfield | 267/166 |
|---|---|---|---|---|
| 2,028,122 | * | 1/1936 | Floreth | 267/170 |
| 2,559,732 | * | 7/1951 | Padgett | 267/157 |
| 2,668,615 | * | 2/1954 | Sampatacos | 226/184 |
| 3,030,783 | * | 4/1962 | Schmidt | 267/155 |
| 3,055,689 | * | 9/1962 | Jorgensen | 267/177 |
| 3,166,950 | * | 1/1965 | Pomeranz | 267/168 |
| 3,880,414 | * | 4/1975 | Smith et al. | 267/168 |
| 3,905,403 | * | 9/1975 | Smith et al. | 267/168 |
| 4,582,653 |   | 4/1986 | Blanchard et al. . |  |
| 4,828,235 |   | 5/1989 | Paggeot . |  |
| 4,889,327 | * | 12/1989 | Seyler | 267/168 |
| 5,368,283 |   | 11/1994 | Pavlin . |  |
| 5,464,197 | * | 11/1995 | Ecclesfield | 267/168 |

FOREIGN PATENT DOCUMENTS

| 803966 | * | 4/1951 | (DE) | 267/155 |
|---|---|---|---|---|
| 865160 | * | 4/1940 | (FR) | 267/155 |
| 365451 | * | 12/1938 | (IT) | 267/155 |

* cited by examiner

Primary Examiner—Robert J. Oberleitner
Assistant Examiner—Robert A. Siconolfi
(74) Attorney, Agent, or Firm—Robert E. Browne; John E. Hyatt (57) ABSTRACT

A multiple torsion spring assembly according to the present invention may be provided with a coiled helical torsion spring. The spring has first and second end coils, and a plurality of intermediate coils between the first and second end coils. The first end coil inner diameter is less than the inner diameter of the intermediate coils. The second end coil inner diameter is less than the inner diameter of the first end coil. The spring may be used to control a throttle return of a throttle body. Methods of manufacturing spring assemblies are also disclosed.

12 Claims, 7 Drawing Sheets

MULTIPLE TORSION SPRING AND METHODS OF USE

FIELD OF THE INVENTION

The present invention relates to multiple torsion springs. The springs of the present invention may be used in various applications, but are particularly suitable for effecting closure of a throttle valve of a throttle body or carburetor of an automobile internal combustion engine.

BACKGROUND OF THE INVENTION

Use of springs and spring assemblies for effecting throttle valve operation is well known in the art. Reference may be made to Blanchard et al. U.S. Pat. No. 4,582,653, which is incorporated herein by reference, for a more detailed disclosure of a typical throttle body equipped with a spring assembly for returning a throttle valve toward a closed position.

Figures 1, 2:
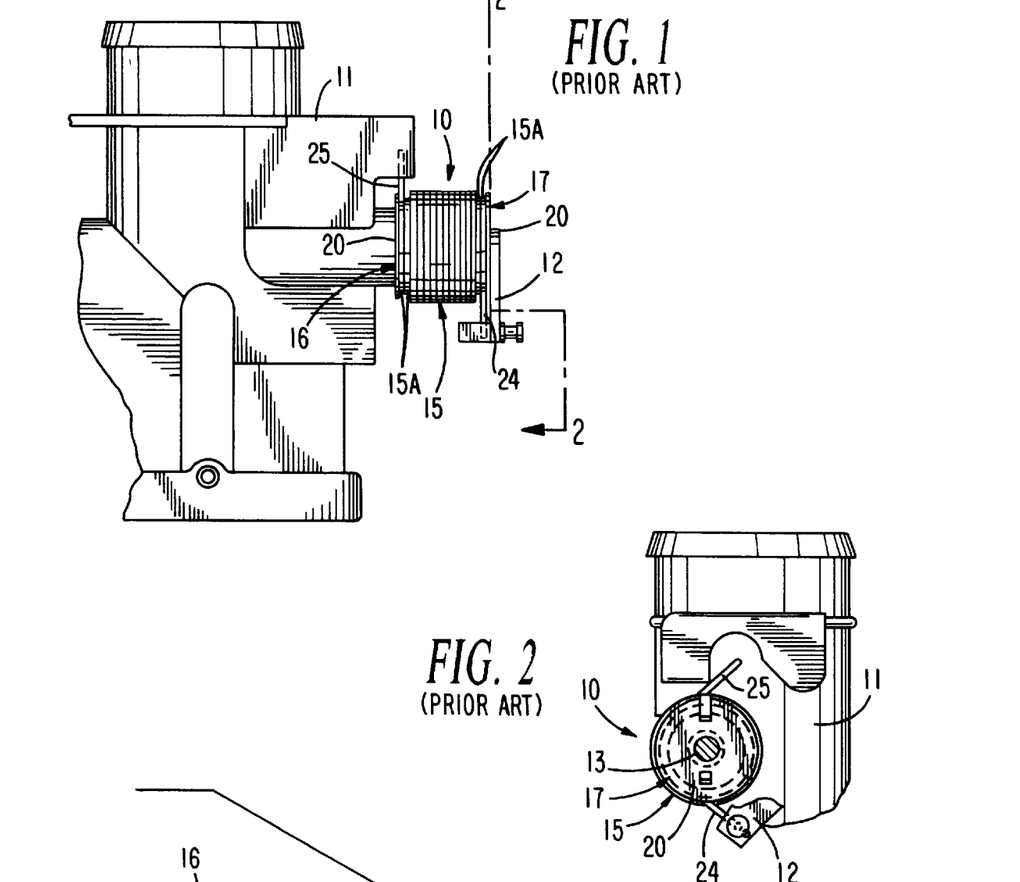
FIG. 1 shows an elevated side view of a prior art spring assembly positioned on a shaft of a throttle body.
FIG. 2 shows an end view of the spring assembly shown in FIG. 1.
Figure 3:
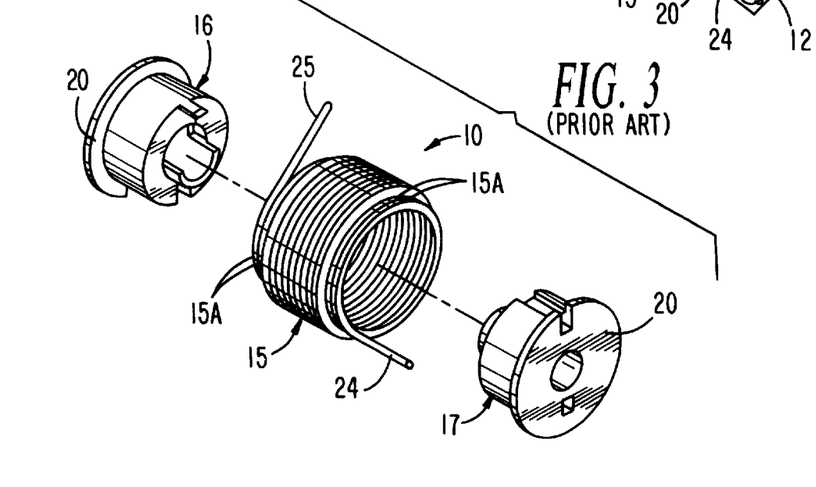
FIG. 3 shows a perspective view of the prior art spring assembly of FIG. 1.
Figure 4:
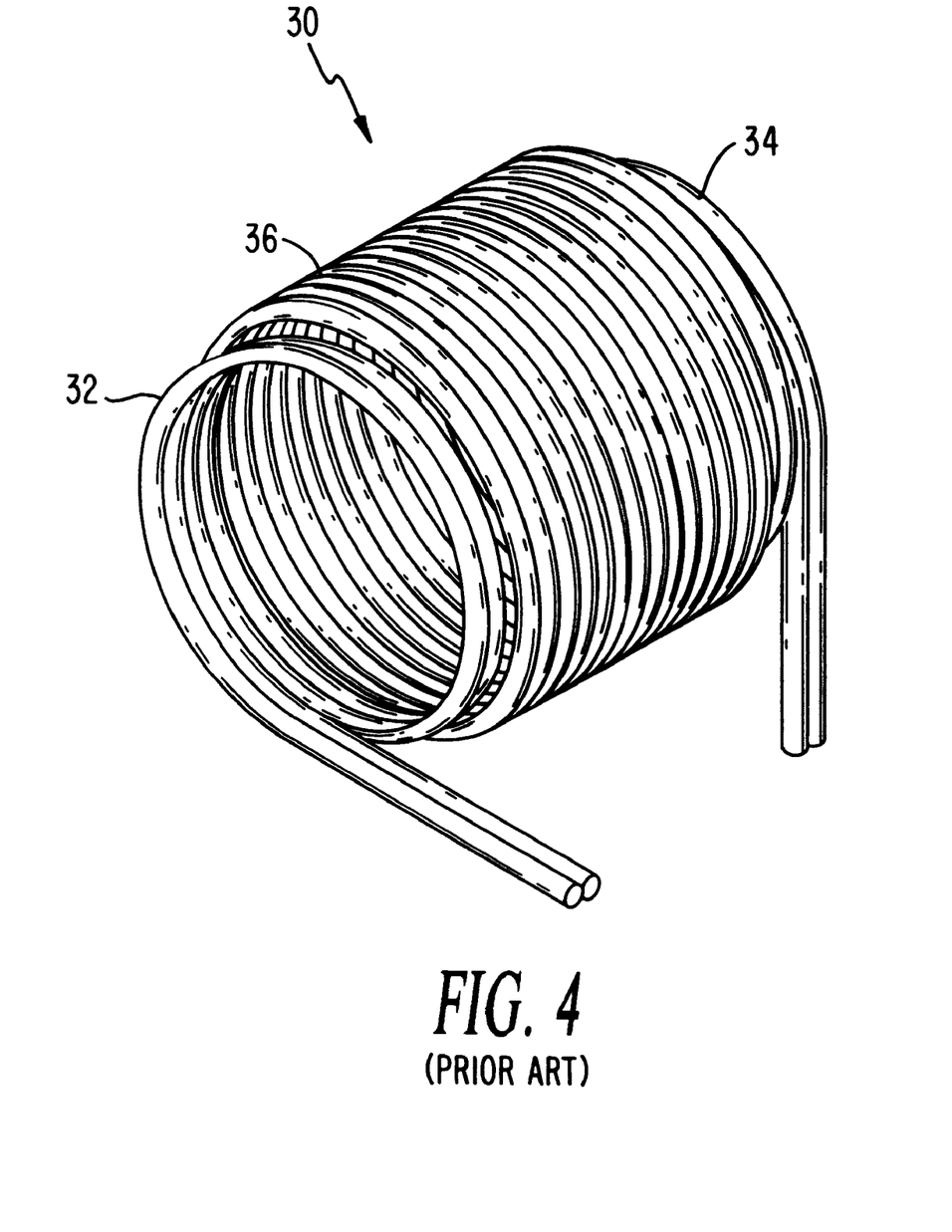
FIG. 4 shows a perspective view of a prior art dual torsion spring having end coils of identical diameters.
Figure 5:
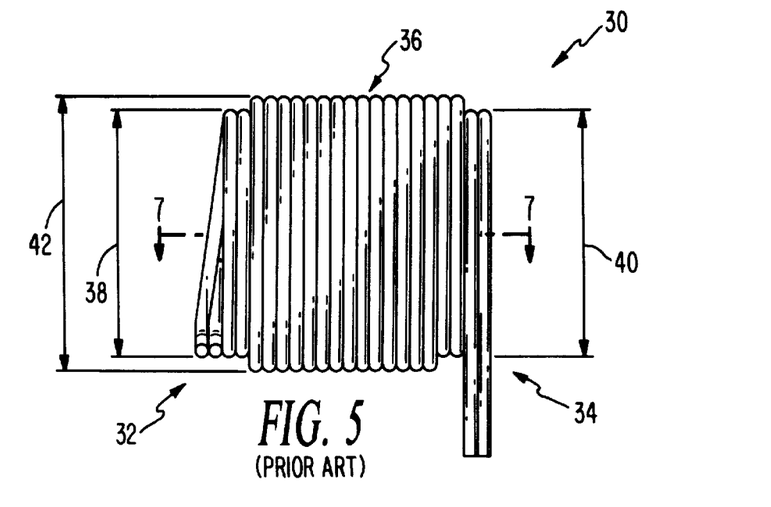
FIG. 5 shows a side view of the prior art spring shown in FIG. 4.
Figure 6:
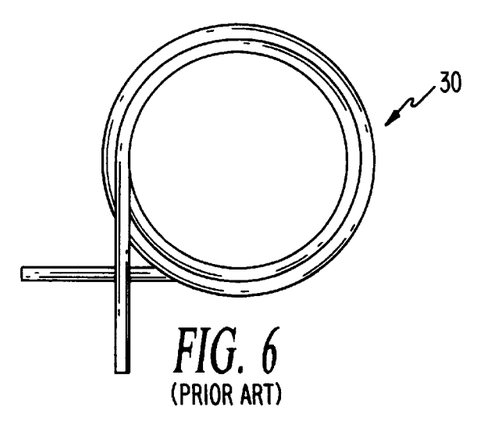
FIG. 6 shows an end view of the prior art spring shown in FIG. 4.
Figure 7:
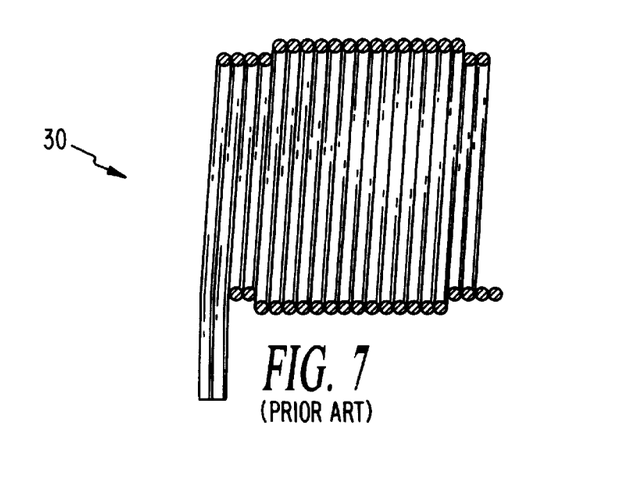
FIG. 7 shows a section view of the prior art spring shown in FIG. 5 cut through section lines 7—7.
Figure 8:
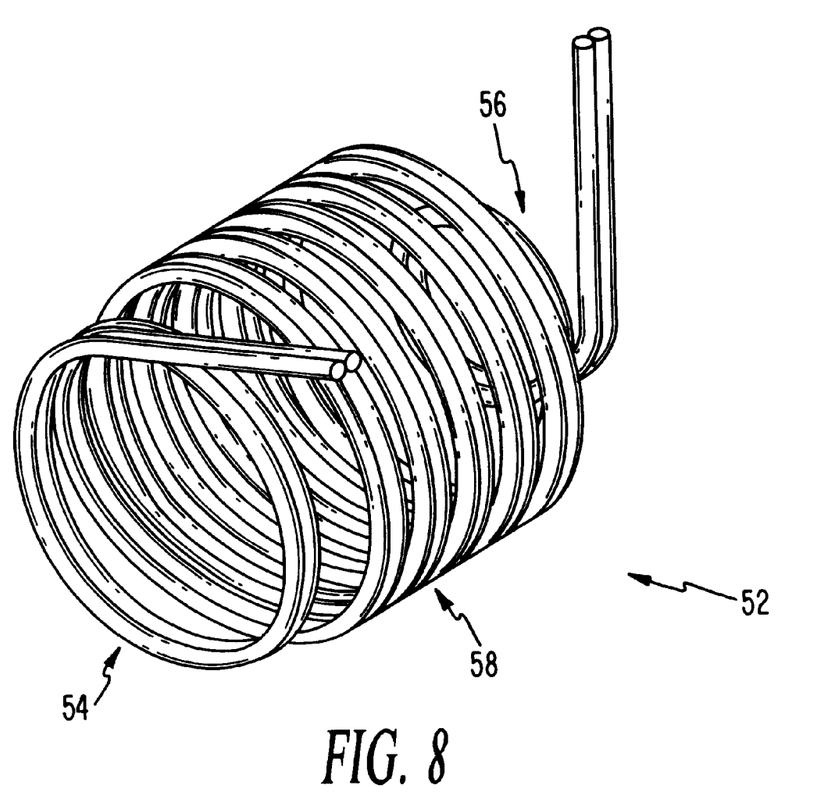
FIG. 8 shows a perspective view of a dual torsion spring according to the present invention.

FIGS. 1–3 illustrate a prior art single torsion spring assembly 10. The spring assembly 10 is described in detail in Pavlin U.S. Pat. No. 5,368,283 which is incorporated herein by reference. The spring 10 is referred to herein as a single torsion spring because it is coiled from a single strand of music wire. Reference is also made to Paggeot U.S. Pat. No. 4,828,235 which describes a similar single torsion spring, and which is also incorporated herein by reference.

The spring assembly 10 is shown in FIGS. 1–2 in conjunction with a throttle body 11 of an automobile internal combustion engine. The throttle body 11 includes a lever 12 supported to rotate about the axis of a shaft 13 (FIG. 2). Rotation of the lever 12 in one direction effects opening of the throttle valve (not shown) of the throttle body 11, while reverse rotation of the lever 12 by the spring assembly 10 effects closing of the throttle valve.

The spring assembly 10 includes a coiled torsion spring 15 having two coils 15A adjacent each end of the spring and a pair of end bushings 16 and 17 (FIG. 3). The torsion spring 15 is wound helically from round music wire and is formed with the end coils 15A being of a reduced diameter. The end coils 15A of the single torsion spring are of equivalent diameter, albeit reduced from the diameter of intermediate coils. Tangs 24 and 25 extend radially from the coils. One tang is parallel to a longitudinal axis of the spring.

A dual torsion spring, that is a spring comprising two coiled strands, may be produced by coiling the two strands about a coiling shaft (or simply shaft). The dual torsion spring is then slid off of the shaft. Such a shaft wound dual torsion spring is not capable of having two reduced reduce end coils, one on either side of the intermediate coils. Further, one reduced end coil is difficult to achieve via a shaft wound method. These limitations are a result of the fact that a spring wound as such on a shaft cannot be slid off of the shaft after it is formed without deforming it.

Recently dual torsion springs having reduced end coils, wherein the end coils are of equivalent diameters, have become known in the art. FIGS. 4–7 illustrate such a prior art dual torsion spring 30. The dual torsion spring 30 has a first end coil 32 and a second end coil 34 separated by intermediate coils 36. The first end coil 32 has a diameter 38 and the second end coil 34 has a diameter 40 of the same size. Both end coil diameters are reduced in size as compared to a diameter 42 of the intermediate coils 36.

The dual wound torsion springs shown in FIGS. 4–7 have been produced utilizing what may be referred to as single-wound technology. Each strand is formed into a coil and then, through post-wind operation, the strands are merged into a dual torsion spring. Heretofore, known manufacturing techniques required each end coil to be of equal diameters. This had certain disadvantages, particularly relevant to shafts of throttles, wherein the shafts had to be over built (or over molded) at one end to accommodate the diameter of an end coil. With reference to FIGS. 1 and 2, this would generally require shaft 13 to be over built near lever 12.

Embodiments of the present invention overcome these and other problems.

SUMMARY OF THE INVENTION

The present invention relates to multiple torsion springs. It more particularly relates to dual torsion springs having dissimilar reduced end coils.

A multiple torsion spring assembly according to the present invention may be provided with a coiled helical dual torsion spring. The spring has first and second end coils, and a plurality of intermediate coils between the first and second end coils. The first end coil inner diameter is less than the inner diameter of the intermediate coils. The second end coil inner diameter is less than the inner diameter of the first end coil.

The multiple torsion spring assembly may be manufactured by supplying at least two strands simultaneously to deflection structure of a type commonly known in the art and deflecting the two strands. The two strands are deflected into a plurality of coils including the first and second end coils and the intermediate coils. The inner diameter of the first end coil is formed smaller than the inner diameter of the intermediate coils. Likewise the inner diameter of the second coil is formed smaller than the inner diameter of the first end coil.

An inventive deflection structure comprising a coiling point assembly is provided herein. The coiling point assembly generally includes a relatively fixed coiling point and a relatively movable coiling point. Preferably two coiling point components are used for dual torsion springs. Each coiling point includes a guide, e.g a groove, for guiding the wires during the coiling process.

The spring may be used to control a throttle return of a throttle body including a lever supported to rotate about an axis of a shaft, and wherein rotation of the lever effects positioning of a throttle valve. The spring is positioned on the shaft to effect rotation of the lever. This includes positioning a tang of one of the end coils to provide a primary source of throttle control. Another tang of the same end coil is positioned to provide a secondary source of throttle control. Other variations using the spring to effect the valve will be apparent to those of skill in the art.

Accordingly, one object of the present invention is to provide a new and improved torsion spring. The intermediate coils shown in FIG. 13 comprise a portion where the coils taper, in diameter, to form a fructo-conical shape.

Another object of the present invention is to provide a more robust throttle body at a reduced cost.

Another object of the present invention is to provide a more reliable throttle body. A further object is to provide a means for complying with federal standards and regulations requiring system redundancy of select parts.

Another object is to provide improved means and methods for forming springs.

Other objects and advantages of the present invention will be apparent from the following detailed discussion of exemplary embodiments with reference to the attached drawings and claims.

DESCRIPTION OF EXEMPLARY EMBODIMENTS

The present invention is discussed in relation to dual torsion springs for throttle bodies of automobiles; other uses will be apparent from the teachings disclosed herein. The present invention will be best understood from the following detailed description of exemplary embodiments with reference to the attached drawings, wherein like reference numerals and characters refer to like parts, and by reference to the following claims.

Figure 11:
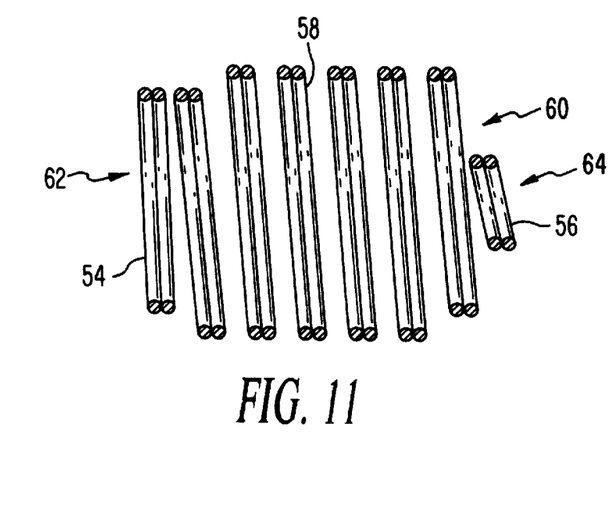
FIG. 11 shows a section view of the spring shown in FIG. 9 cut through section line 11—11.

A multiple torsion spring assembly 50 according to an embodiment of the present invention is shown in FIGS. 8–11. The spring assembly 50 comprises a coiled helical dual torsion spring 52 having first and second end coils 54 and 56. A plurality of intermediate coils 58 is located between the first and second end coils 54 and 56, respectively. Referring to FIG. 11, the intermediate coils 58 have an inner diameter 60 and the first end coil 54 has an inner diameter 62 which is less than the inner diameter 60 of the intermediate coils 58. The second end coil 56 has an inner diameter 64 which is less than the inner diameter 62 of the first end coil 54. It will be understood that a "dual torsion" spring generally includes two coils, from two respective wire strands, per coil set. And, a "multiple torsion" spring generally includes at least two coils, from respective stands, per coil set.

Figure 12:
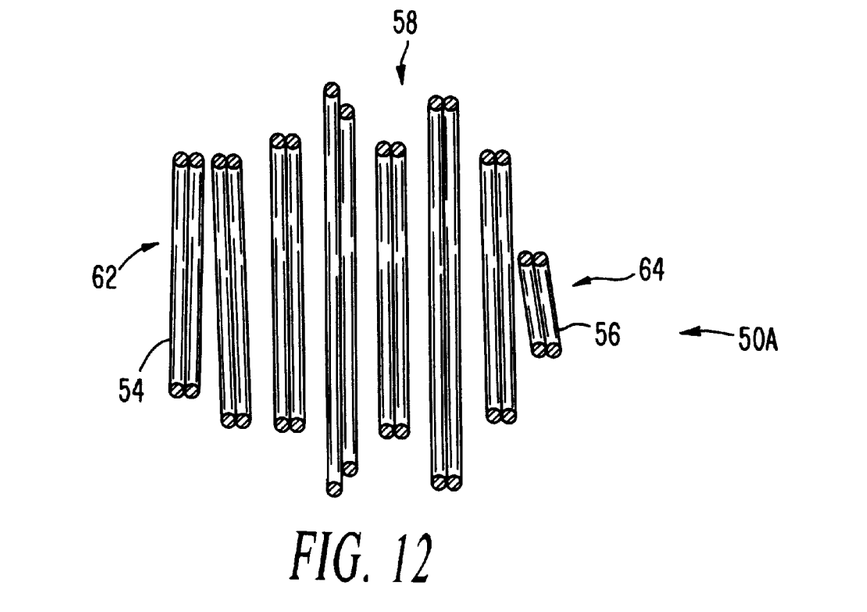
FIG. 12 shows a section view of a spring having non-uniform intermediate coils.

The intermediate coils 58 shown in FIGS. 8–11 are of a uniform diameter, but other variations including multiple dimensioned (i.e. non-uniform) inner diameters may be used for some applications. FIG. 12 depicts a section view of a spring 50A in which the intermediate coils 58 are non-uniform. Accordingly, the inner diameter 60 would be non-uniform. Further the coils, intermediate and end, may be spaced closely together, as shown in prior art FIGS. 4–7, or spaced apart as shown in FIGS. 8–11.

In a preferred embodiment, the coiled helical dual torsion spring 52 is adapted to cooperate with a throttle body 11 having a shaft 13 of a predetermined diameter. The second end coil inner diameter 64 is adapted to conform to the shaft predetermined diameter. This eliminates the need for over molding the shaft 13.

Figure 9:
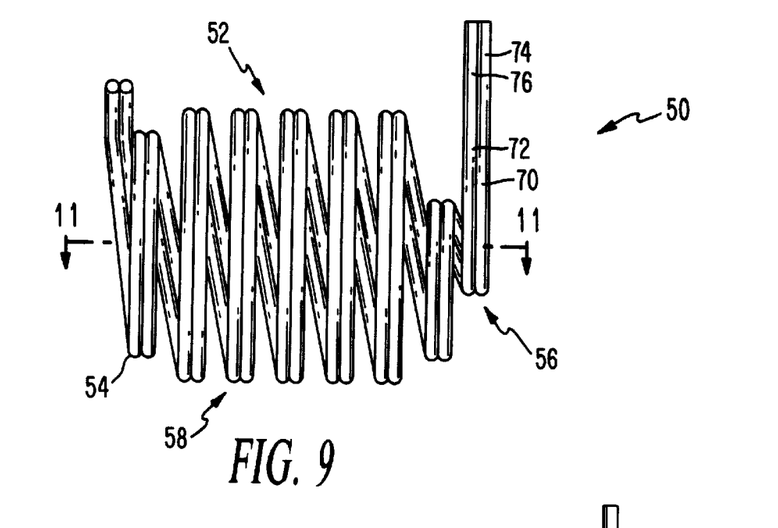
FIG. 9 shows a side view of the spring shown in FIG. 8.
Figure 10:
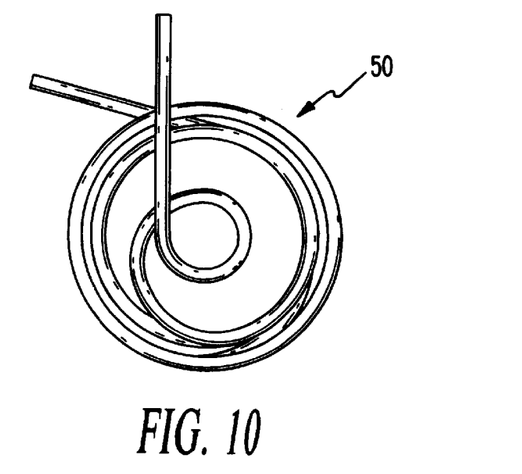
FIG. 10 shows an end view of the spring shown in FIG. 8.

A method of manufacturing the multiple torsion spring assembly 50 may comprise supplying strands of music wire 70 and 72 simultaneously to a deflection structure. The two strands 70 and 72 may be simultaneously deflected into a plurality of coils including first and second end coils 54 and 56, and intermediate coils 58 between the first and second end coils 54 and 56. The invention is not limited to wire; suitable alternatives will be apparent to those of skill. The first end coil 54 is formed into an inner diameter 62 smaller than an inner diameter 60 of the intermediate coils 58. An inner diameter 64 of the second end coil 56 is formed smaller than the inner diameter 60 of the intermediate coils 58 and smaller than the inner diameter 62 of the first end coil 54. The two strands 70 and 72 may be generally adjacent to one and another as shown in FIG. 9.

Figure 13:
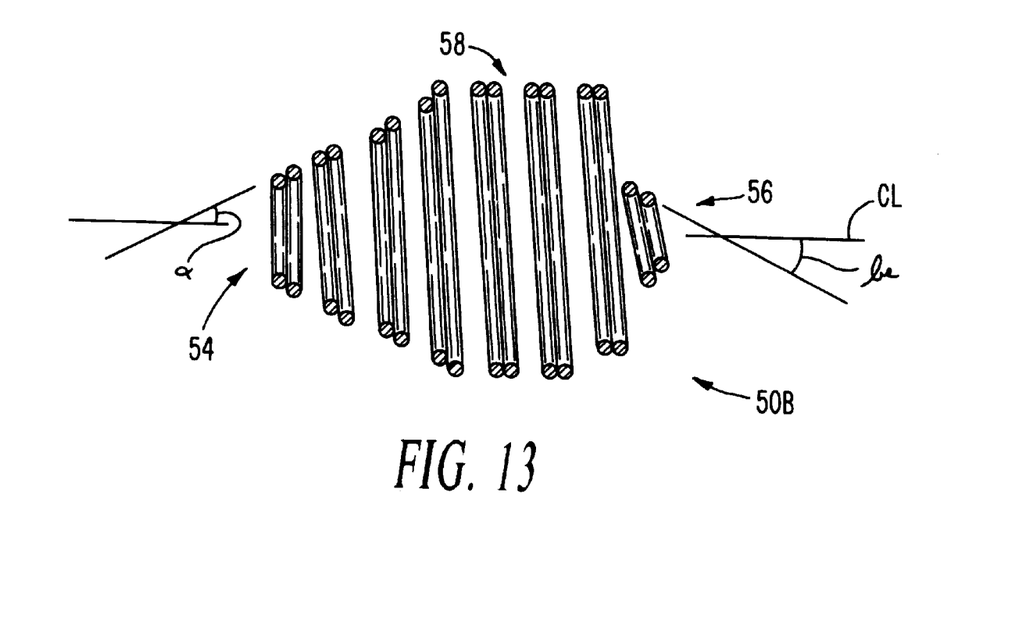
FIG. 13 shows a pitched spring.

Simultaneous deflection does not require each coil of a given coil set to be of an equal diameter. FIG. 13 depicts a section view of a pitched multi-torsion spring assembly 50B. The first end coil 54 is pitched a positive pitch angle alpha ($\alpha$) relative to a center line CL. The second end coil 56 is shown at a negative pitch angle beta ($\beta$).

The multiple torsion spring 50 may be used to control the throttle return of a throttle body 11 including a lever 12 supported to rotate about an axis of a shaft 13, wherein rotation of the lever 12 effects positioning of a throttle valve. The spring 50 is positioned on the shaft 13 to effect rotation of the lever 12. A tang 74 of the first end coil 54, or second end coil 56, is positioned to provide a primary source of throttle control. The other tang 76 of the same end coil is positioned to provide a secondary source of throttle control.

Figure 14:
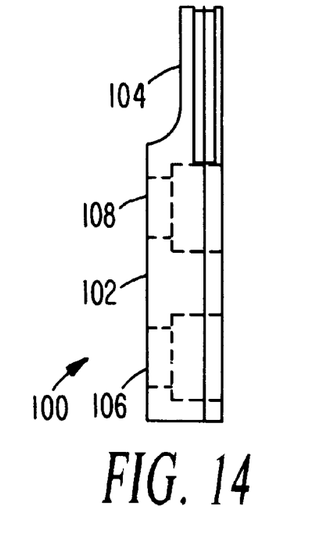
FIG. 14 shows a top view of a coiling point assembly according to the present invention and including a movable coiling point.
Figure 15:
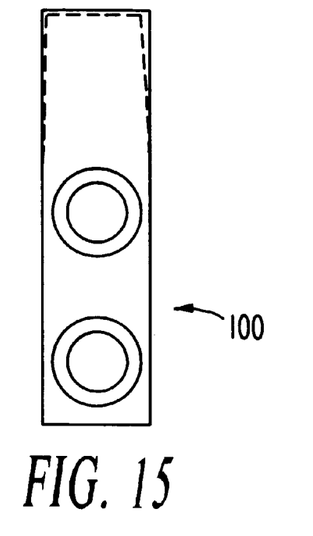
FIG. 15 shows a side view of the coiling point assembly shown in FIG. 14.
Figure 16:
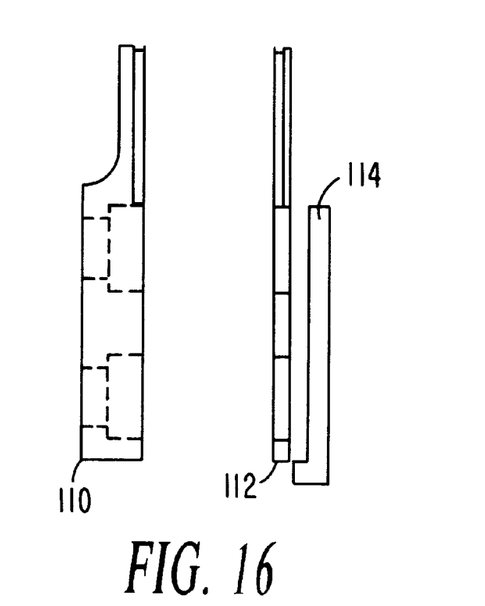
FIG. 16 shows an exploded view of the coiling point assembly of FIG. 14, and further including a cover plate.
Figure 17:
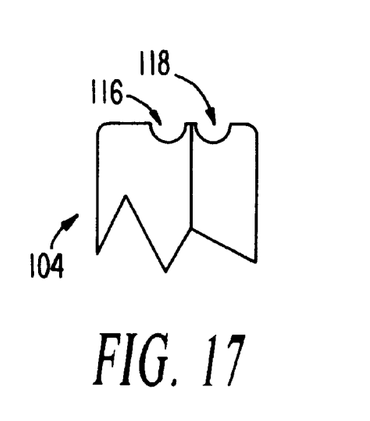
FIG. 17 shows an end view of the coiling end of the coiling point assembly.

Deflection structure used to coil the strands may include, among other devices, coiling points of a coiling machine. Coiling machines are well known in the art and will not be further described. FIG. 14 shows a top view of a coiling point assembly 100 suitable for manufacturing a dual torsion spring assembly 50. The coiling point assembly 100 includes a mounting end 102 and a coiling end 104. Mounting end 102 is mounted to a coiling machine (not shown) with bore holes 106 and 108. FIG. 15 shows a side view of the coiling assembly 100. The coiling point assembly 100 preferably includes a fixed point 10 and a movable point 112, better seen in FIG. 16. FIG. 16 depicts a cover plate 114 for the movable point 112. It is to be understood that fixed point 110 is not fixed absolutely to the coiling machine; both coiling points are movable to form coils of differing diameters. The movable point 112 is however movable relative to the fixed point 110. FIG. 17 shows a partial end view of the coiling end 104. Grooves 116 and 118 provide means for positioning the strands and for maintaining relative positioning of the strands during the coiling process.

Thus, although there have been described particular embodiments of the present invention of a new and useful Multiple Torsion Spring And Methods of Use, it is not intended that such references be construed as limitations upon the scope of this invention except as set forth in the following claims.

The invention claimed is:

1. A multiple torsion spring comprising
a plurality of strands disposed in parallel relation and simultaneously deflected to form a coiled helix having first and second end coils, and a plurality of intermediate coils between the first and second end coils, wherein
the intermediate coils have an inner diameter,
the first end coil has an inner diameter less than the inner diameter of the intermediate coils, and
the second end coil has an inner diameter less than the inner diameter of the first end coil.

2. The spring of claim 1, wherein the inner diameter of the intermediate coils is uniform.

3. The spring of claim 1, wherein the inner diameter of the intermediate coils is non-uniform.

4. The spring of claim 1, wherein the coiled helix is adapted to cooperate with a throttle body having a shaft of a predetermined diameter and wherein the second end coil inner diameter conforms to the shaft predetermined diameter.

5. The spring of claim 1, wherein at least one of the first and the second end coils is pitched relative to a center line through the coiled helix.

6. The spring of claim 1, wherein the coiled helical multiple torsion spring is a coiled helical dual torsion spring.

7. A coiled multiple torsion spring comprising:
a plurality of strands disposed in parallel relation and simultaneously deflected to form:
a first end coil;
a second end coil; and
a plurality of non-uniform intermediate coils between the first and second end coils.

8. The spring of claim 7, wherein the first end coil is pitched relative to the intermediate coils.

9. The spring of claim 7, wherein at least one of the non-uniform intermediate coils formed from the simultaneously deflected strands comprises: a first diameter defined by one of the strands; and a second diameter defined by a second of the strands, wherein the second diameter is smaller than the first diameter.

10. A coiled multiple torsion spring comprising:
a plurality of strands disposed in parallel relation and simultaneously deflected to form:
a first end coil;
a second end coil; and
a plurality of intermediate coils between the first and second end coils,
wherein at least one of the first and second end coils is pitched relative to the intermediate coils.

11. The spring of claim 10, wherein both of the first and second end coils are pitched relative to the intermediate coils and the second end coil is pitched relative to the first end coil.

12. The spring of claim 10, wherein the intermediate coils form a fructoconical shape.

* * * * *

UNITED STATES PATENT AND TRADEMARK OFFICE
CERTIFICATE OF CORRECTION

PATENT NO. : 6,220,586 B1
DATED : April 24, 2001
INVENTOR(S) : Pavlin et al.

It is certified that error appears in the above-identified patent and that said Letters Patent is hereby corrected as shown below:

Column 4,
Line 58, "10" should be -- 110 --

Signed and Sealed this

Eighteenth Day of December, 2001

Attest:

Attesting Officer

JAMES E. ROGAN
*Director of the United States Patent and Trademark Office*